(12) United States Patent
Lim et al.

(10) Patent No.: US 12,362,364 B2
(45) Date of Patent: Jul. 15, 2025

(54) ALL-SOLID-STATE BATTERY WITH IMPROVED DURABILITY AND METHOD OF MANUFACTURING THE SAME

(71) Applicants: Hyundai Motor Company, Seoul (KR); Kia Corporation, Seoul (KR)

(72) Inventors: Jae Min Lim, Gyeonggi-do (KR); Hong Suk Choi, Gyeonggi-do (KR); Sung Man Cho, Gyeonggi-do (KR); Seon Hwa Kim, Chungcheongbuk-do (KR); Young Jin Nam, Gyeonggi-do (KR); Sang Wan Kim, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 473 days.

(21) Appl. No.: 17/883,059

(22) Filed: Aug. 8, 2022

(65) Prior Publication Data

US 2023/0058012 A1 Feb. 23, 2023

(30) Foreign Application Priority Data

Aug. 19, 2021 (KR) ........................ 10-2021-0109132

(51) Int. Cl.
| | |
|---|---|
| *H01M 4/62* | (2006.01) |
| *H01M 4/04* | (2006.01) |
| *H01M 4/134* | (2010.01) |
| *H01M 4/1395* | (2010.01) |
| *H01M 4/02* | (2006.01) |

(52) U.S. Cl.
CPC ......... *H01M 4/625* (2013.01); *H01M 4/0404* (2013.01); *H01M 4/134* (2013.01); *H01M 4/1395* (2013.01); *H01M 2004/021* (2013.01); *H01M 2004/027* (2013.01); *H01M 2220/20* (2013.01)

(58) Field of Classification Search
CPC .... H01M 4/625; H01M 4/0404; H01M 4/134; H01M 4/1395; H01M 2004/021; H01M 10/0562; H01M 2300/0065; H01M 2300/0068; H01M 2300/0071; H01M 2300/0074; H01M 2300/0077; H01M 2300/008
See application file for complete search history.

(56) References Cited

U.S. PATENT DOCUMENTS 10,254,043 B2   4/2019  Ho et al.
2019/0157723 A1* 5/2019  Suzuki .............. H01M 10/0562

FOREIGN PATENT DOCUMENTS

| JP | 6437618 B2 | 12/2018 |
|---|---|---|
| KR | 2018-0091678 A | 8/2018 |
| KR | 102034809 B1 | 10/2019 |
| KR | 2021-0005147 A | 1/2021 |

\* cited by examiner

*Primary Examiner* — Christopher P Domone
(74) *Attorney, Agent, or Firm* — Fox Rothschild LLP

(57) ABSTRACT

Disclosed are an all-solid-state battery that may have uniform deposition of lithium and have excellent durability, and a method of manufacturing the same.

14 Claims, 4 Drawing Sheets

ALL-SOLID-STATE BATTERY WITH IMPROVED DURABILITY AND METHOD OF MANUFACTURING THE SAME

CROSS-REFERENCE TO RELATED APPLICATION

This application claims under 35 U.S.C. § 119 (a) the benefit of priority to Korean Patent Application No. 10-2021-0109132, filed on Aug. 19, 2021, the entire contents of which are incorporated herein by reference.

TECHNICAL FIELD

The present invention relates to an all-solid-state battery having uniform deposition of lithium and having excellent durability, and a method of manufacturing the same.

BACKGROUND

An all-solid-state battery has a three-layered laminate structure including a cathode layer bonded to a cathode current collector, an anode layer bonded to an anode current collector, and a solid electrolyte interposed between the cathode layer and the anode layer. In general, an anode layer of an all-solid-state battery includes an active material such as graphite and a solid electrolyte. The solid electrolyte may promote the movement of lithium ions in the anode layer. However, the solid electrolyte has a higher specific gravity than that of an electrolyte of a lithium ion battery, and thus may decrease the proportion of the active material in the anode layer, so an all-solid-state battery may have reduced actual energy density than that of the lithium ion battery.

In order to increase the energy density of an all-solid-state battery, research has been underway to apply lithium metal as an anode layer. However, all-solid-state batteries to which lithium metal is applied should overcome many obstacles, such as technical problems including interfacial bonding and growth of lithium dendrites and industrial problems such as high cost and increased area.

In recent years, research has been conducted on an all-solid-state battery in which the anode layer is removed and lithium ions moving toward the anode current collector are directly deposited on the anode current collector during charging. However, such an all-solid-state battery has problems, e.g., lithium may not be precipitated uniformly on the anode current collector, and thus an irreversible reaction increases and durability is deteriorated.

The above information disclosed in this Background section is only for enhancement of understanding of the background of the invention, and therefore it may contain information that does not form the prior art that is already known in this country to a person of ordinary skill in the art.

SUMMARY

In preferred aspects, provided are an all-solid-state battery enabling uniform deposition of lithium and having excellent durability and a method of manufacturing the same.

The objects of the present invention are not limited to those described above. Other objects of the present invention will be clearly understood from the following description, and are able to be implemented by means defined in the claims and combinations thereof.

In one aspect, provided is an all-solid-state battery including an anode current collector, a functional layer disposed on the anode current collector, a solid electrolyte layer disposed on the functional layer, and a cathode layer disposed on the solid electrolyte layer. The functional layer may include one or more components that forms an alloy or a compound with lithium, and include a first interfacial layer at a side of the solid electrolyte layer and a second interfacial layer at a side of the anode current collector.

The term "all-solid battery" as used herein refers to a lithium battery or secondary battery containing a solid state or semi-solid state electrolyte in a rigid form (e.g., film, solid layer or etc.) that replaces liquid, gel state, or polymer type electrolyte.

In particular, a ratio (b/a) of a binding force (b) of the second interfacial layer to a binding force (a) of the first interfacial layer may be about 0.6 or greater.

The binding force of the first interfacial layer and the second interfacial layer may be measured by oblique-cutting from the surface of each interfacial layer to a predetermined depth using a surface and interfacial cutting analysis system (SAICAS), and converting the force applied to the surface and interfacial cutting analysis system from the cut point.

The binding force may be obtained by oblique-cutting the first interfacial layer and the second interfacial layer to a depth of greater than 0 μm and not greater than about 3 μm from the surface of the interfacial layer using the surface and interfacial cutting analysis system.

The one or more components in the functional layer may suitably include amorphous carbon and a metal powder that forms the alloy or compound with lithium. The metal powder may suitably include one or more selected from the group consisting of gold (Au), platinum (Pt), palladium (Pd), silicon (Si), silver (Ag), aluminum (Al), bismuth (Bi), tin (Sn), and zinc (Zn).

The functional layer may include a binder.

The functional layer may have a thickness of about 10 μm to 30 μm.

When the all-solid-state battery is charged, lithium metal may be deposited between the functional layer and the anode current collector.

In another aspect, provided is a method of manufacturing an all-solid-state battery. The method includes steps of: preparing a slurry containing amorphous carbon, a metal powder, and a binder, applying the slurry onto a substrate, primarily drying the substrate applied with the slurry at a first temperature for a first period, secondarily drying the primarily dried substrate applied with the slurry at a second temperature less than the first temperature for a second period longer than the first period to form a functional layer, and obtaining a structure in which the anode current collector, the functional layer, the solid electrolyte layer, and the cathode layer are sequentially laminated.

In particular, the metal powder may form an alloy or compound with lithium.

The primary drying may be performed at a temperature of about 100° C. to 140° C. for about 0.5 minutes to 5 minutes.

The secondary drying may be performed at a temperature of about 80° C. to 100° C. for about 10 minutes or less.

Also provided is a vehicle including the all-solid battery as described herein.

Other aspects of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

DETAILED DESCRIPTION

Figure 1:
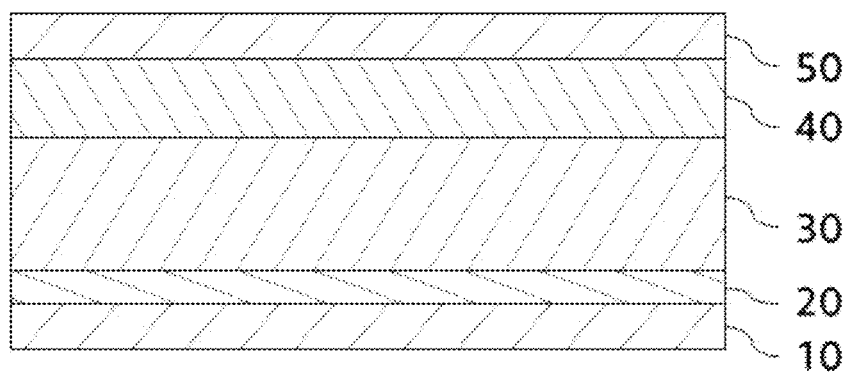
FIG. 1 shows an exemplary all-solid-state battery according to an exemplary embodiment of the present invention.

The objects described above, as well as other objects, features and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 shows an exemplary all-solid-state battery according to an exemplary embodiment of the present invention. For example, the all-solid-state battery may have a structure in which an anode current collector 10, a functional layer 20, a solid electrolyte layer 30, a cathode layer 40, and a cathode current collector 50 are laminated.

Figure 2:
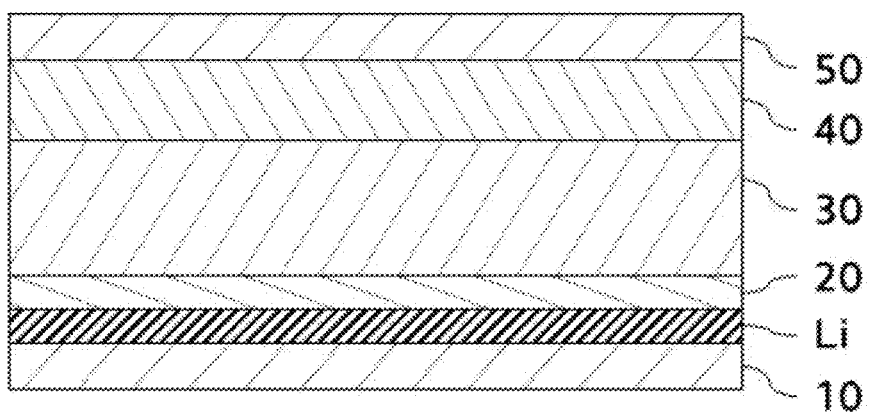
FIG. 2 shows the state in which an exemplary all-solid-state battery according to an exemplary embodiment of the present invention is charged.

FIG. 2 shows the state in which an exemplary all-solid-state battery according to an exemplary embodiment of the present invention is charged. When the all-solid-state battery is charged, lithium metal (Li) may be deposited and stored between the functional layer 20 and the anode current collector 10.

Hereinafter, each component of the all-solid-state battery will be described in detail.

Cathode Current Collector

The cathode current collector 50 may be an electrically conductive plate-shaped substrate. The cathode current collector 50 may be in the form of a sheet or a thin film.

The cathode current collector 50 may include one or more selected from the group consisting of indium, copper, magnesium, aluminum, stainless steel, and iron.

Cathode Layer

The cathode layer 40 is configured to reversibly intercalate and deintercalate lithium ions. The cathode layer 40 may include a cathode active material, a solid electrolyte, a conductive material, a binder, and the like.

The cathode active material may suitably include an oxide active material or a sulfide active material.

The oxide active material may suitably include a rock-salt-layer-type active material such as $LiCoO_2$, $LiMnO_2$, $LiNiO_2$, $LiVO_2$, or $Li_{1+x}Ni_{1/3}Co_{1/3}Mn_{1/3}O_2$, a spinel-type active material such as $LiMn_2O_4$ or $Li(Ni_{0.5}Mn_{1.5})O_4$, a reverse-spinel-type active material such as $LiNiVO_4$ or $LiCoVO_4$, an olivine-type active material such as $LiFePO_4$, $LiMnPO_4$, $LiCoPO_4$, or $LiNiPO_4$, a silicon-containing active material such as $Li_2FeSiO_4$ or $Li_2MnSiO_4$, a rock-salt-layer-type active material having a transition metal, a portion of which is substituted with a heterogeneous metal such as $LiNi_{0.8}Co_{(0.2-x)}Al_xO_2$ (0<x<0.2), a spinel-type active material having a transition metal, a portion of which is substituted with a heterogeneous metal such as $Li_{1+x}Mn_{2-x-y}M_yO_4$ (wherein M includes at least one of Al, Mg, Co, Fe, Ni, Zn, and 0<x+y<2), and lithium titanate, such as $Li_4Ti_5O_{12}$.

The sulfide active material may suitably include copper Chevrel, iron sulfide, cobalt sulfide, nickel sulfide, or the like.

The solid electrolyte may suitably include an oxide solid electrolyte or a sulfide solid electrolyte. However, a sulfide solid electrolyte, having high lithium ion conductivity, may be preferably used. The sulfide solid electrolyte is not particularly limited, but may suitably include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$ZmSn$ (wherein m and n are positive numbers and Z is one of Ge, Zn or Ga), $Li_2S$—$GeS_2$, $Li_2S$—$SiS_2$—$Li_3PO_4$, $Li_2S$—$SiS_2$—$Li_xMO_y$ (wherein x and y are positive numbers and M is one of P, Si, Ge, B, Al, Ga, or In), $Li_{10}GeP_2S_{12}$, or the like.

The conductive material may suitably include carbon black, conductive graphite, ethylene black, graphene, or the like.

The binder may suitably include butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like.

Solid Electrolyte Layer

The solid electrolyte layer 30 may be disposed between the cathode layer 20 and the anode current collector 30 to allow lithium ions to move therebetween.

The solid electrolyte layer 30 may include a solid electrolyte having lithium ion conductivity.

The solid electrolyte may suitably include an oxide solid electrolyte or a sulfide solid electrolyte. However, a sulfide solid electrolyte having high lithium ion conductivity may be suitably used. The sulfide solid electrolyte is not particularly limited, but may suitably include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$ZmSn$ (wherein m and n are positive numbers and Z is one of Ge, Zn and Ga), $Li_2S$—$GeS_2$, $Li_2S$—$SiS_2$—$Li_3PO_4$, $Li_2S$—$SiS_2$—$Li_xMO_y$ (wherein x and y are positive numbers and M is one of P, Si, Ge, B, Al, Ga, or In), $Li_{10}GeP_2S_{12}$, or the like. The solid electrolyte included in the solid electrolyte layer 30 may be the same as or different from the solid electrolyte included in the cathode layer 40.

The solid electrolyte layer 30 may further include a binder. The binder may suitably include butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like. The binder included in the solid electrolyte layer 30 may be the same as or different from the binder included in the cathode layer 40.

Anode Current Collector

The anode current collector 10 may suitably include a plate-shaped substrate having electrical conductivity. Particularly, the anode current collector 10 may be provided in the form of a sheet or thin film.

The anode current collector 10 may include a material that does not react with lithium. Specifically, the anode current collector 10 may include at least one selected from the group consisting of nickel, stainless steel, titanium, cobalt, iron, and combinations thereof.

(Functional Layer)

The functional layer 20 may be disposed between the anode current collector 10 and the solid electrolyte layer 30 to prevent lithium metal (Li) deposited on and stored in the anode current collector 10 from physically contacting the solid electrolyte layer 30 during charging.

In addition, the functional layer 20 may promote movement of lithium ions through the solid electrolyte layer 30 to deposit the lithium ions on the anode current collector 10.

In order to realize the effect of the functional layer 20, the functional layer 20 may be formed to a thickness of about 10 µm to 30 µm.

The functional layer 20 may include a material that forms an alloy or compound with lithium. Particularly, the functional layer 20 may suitably include amorphous carbon and a metal powder forming an alloy or compound with lithium.

The amorphous carbon may suitably include carbon black such as acetylene black, furnace black, and Ketjen black, graphene, and the like.

The metal powder may suitably include one or more selected from the group consisting of gold (Au), platinum (Pt), palladium (Pd), silicon (Si), silver (Ag), aluminum (Al), bismuth (Bi), tin (Sn), and zinc (Zn).

The functional layer 20 may further include a binder. The binder may impart adhesion to the amorphous carbon, metal powder, and the like. The binder may suitably include butadiene rubber (BR), nitrile butadiene rubber (NBR), hydrogenated nitrile butadiene rubber (HNBR), polyvinylidene difluoride (PVDF), polytetrafluoroethylene (PTFE), carboxymethylcellulose (CMC), or the like. The binder included in the functional layer 20 may be the same as or different from the binder included in the cathode layer 40.

The functional layer 20 may include an amount of about 50% by weight to 70% by weight of the amorphous carbon, an amount of about 20% by weight to 40% by weight of the metal powder, and an amount of about 1% by weight to 10% by weight of the binder, based on the total weight of the functional layer.

In particular, the difference in binding force between specific positions in the functional layer 20 may be reduced by controlling the flow behavior of the binder in the functional layer 20. As used herein, the term "binding force" refers to the degree of cohesion of each component of the functional layer 20.

When the difference in binding force between specific positions in the functional layer 20 is large, the movement of lithium ions within the functional layer 20 is not balanced. Accordingly, the lithium metal (Li) may not be uniformly deposited over the entire area of the anode current collector 10, but there is a high possibility that lithium metal (Li) is intensively deposited and grown at the edge thereof. An interface between a solid and a gas may be formed at the edge of the battery, so the edge of the battery may have a greater surface energy than that of the interior having an interface between a solid and a solid. Therefore, when lithium ions fail to move in a balanced manner, the lithium ions may move toward the edge to thermodynamically stabilize high surface energy, resulting in deposition of lithium metal (Li) on the edge thereof.

In addition, the difference in the binding force increases the interfacial resistance between the functional layer 20 and the solid electrolyte layer 30, so lithium metal (Li) may be precipitated and grown between the functional layer 20 and the solid electrolyte layer 30, rather than between the functional layer 20 and the anode current collector 10. When lithium is deposited between the functional layer 20 and the solid electrolyte layer 30, the lithium may pass through the solid electrolyte layer 30, resulting in short circuit of the battery.

Figure 3:
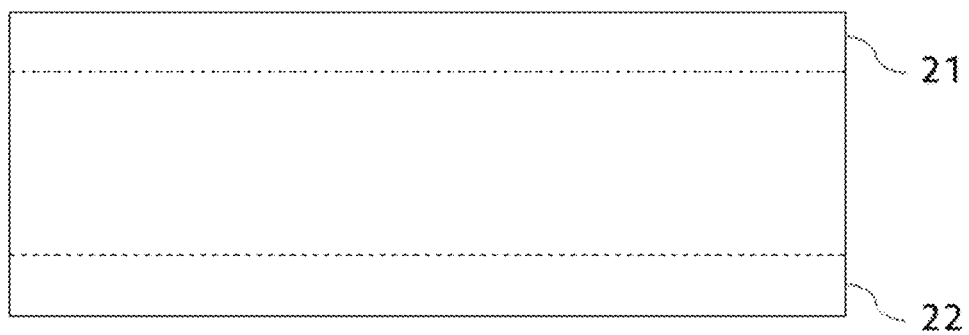
FIG. 3 shows an exemplary functional layer according to an exemplary embodiment of the present invention.

FIG. 3 shows an exemplary functional layer 20. The functional layer 20 may include a first interfacial layer 21 at a side of the solid electrolyte layer 30 and a second interfacial layer 22 at a side of the anode current collector 10.

The present invention is characterized in that the problems described above are solved by adjusting the ratio (b/a) of the binding force (b) of the second interfacial layer to the binding force (a) of the first interfacial layer to be 0.6 or more. When the binding force ratio (b/a) is less than about 0.6, there may occur problems in that lithium metal (Li) is precipitated and grown at the edge of the battery as described above, and is precipitated and grown between the functional layer 20 and the solid electrolyte layer 30.

The binding force of the first interfacial layer 21 and the second interfacial layer 22 may be measured by oblique-cutting from the surface of each interfacial layer 21 or 22 to a predetermined depth using a surface and interfacial cutting analysis system (SAICAS), and converting the force applied to the surface and interfacial cutting analysis system from the cut point.

Figure 4:
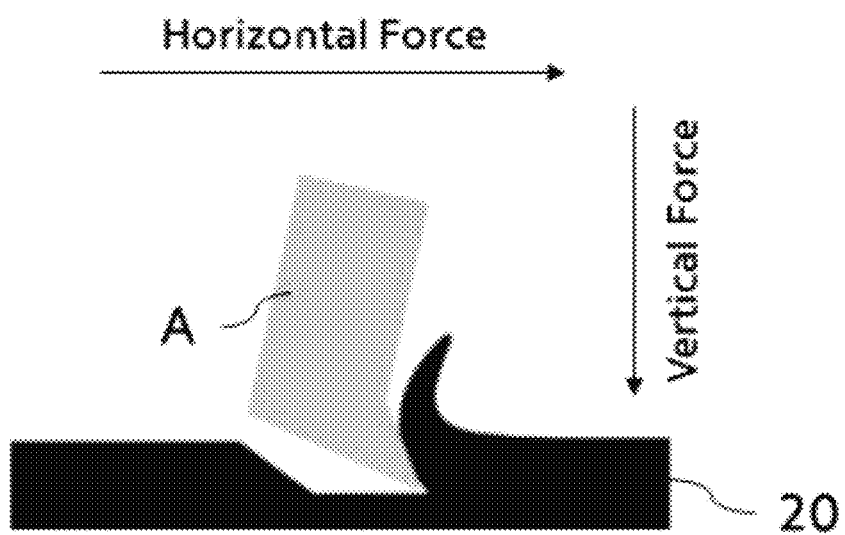
FIG. 4 is a reference diagram for illustrating a method of obtaining a binding force of a functional layer using a surface and interfacial cutting analysis system (SAICAS)

FIG. 4 is a reference diagram for illustrating a method of obtaining a binding force using a surface and interfacial cutting analysis system (SAICAS). For example, the surface of the functional layer 20 is cut with initially set vertical force and horizontal force of a blade A provided in the surface and interfacial cutting analysis system (SAICAS) and the vertical force of the blade A is reset to 0 at a specific depth such that the blade A moves only in the horizontal direction, and at this time, the horizontal force applied to the blade A is converted into a binding force.

The binding force (a) of the first interfacial layer 21 and the binding force (b) of the second interfacial layer 21 may be obtained by oblique-cutting the blade A to a depth greater than 0 μm and not greater than about 3 μm from the surfaces of the first interfacial layer 21 and the second interfacial layer 22.

The functional layer 20 having the ratio (b/a) of the binding force (b) of the second interfacial layer to the binding force (a) of the first interfacial layer, of about 0.6 or greater may be produced as follows.

The functional layer 20 may be obtained by preparing a slurry including amorphous carbon, a metal powder, and a binder, applying the slurry onto a substrate, primarily drying the applied result at a first temperature for a first period, and secondarily drying the primarily dried substrate at a second temperature less than the first temperature for a second period longer than the first period to form a functional layer.

The above-described binding force ratio (b/a) can be realized by rapidly drying the surface of the applied result through the primary drying to suppress the movement of the binder, and then completing drying through the secondary drying.

When the rapid drying such as the primary drying is not performed, the binding force (b) of the second interfacial layer 22 may be reduced and thus the binding force ratio (b/a) may be reduced because the binder moves along the vaporized gas inside the applied result.

The primary drying may be performed at a temperature of about 100° C. to 140° C. for about 0.5 minutes to 5 minutes.

The secondary drying may be performed at a temperature of about 80° C. to 100° C. for about 10 minutes or less, or about 1 to 10 minutes, or about 2.5 to 10 minutes.

Then, a structure in which the anode current collector 10, the functional layer 20, the solid electrolyte layer 30, the cathode layer 40, and the cathode current collector 50 are sequentially laminated may be formed to obtain an all-solid-state battery. At this time, the functional layer 20 may be separately formed and then attached to the anode current collector 10, or the slurry may be directly applied onto the anode current collector 10 as a substrate.

EXAMPLE

Hereinafter, the present invention will be described in more detail with reference to specific examples. However, the following examples are provided only for better understanding of the present invention, and thus should not be construed as limiting the scope of the present invention.

Example

A slurry containing amorphous carbon, a metal powder, and a binder was applied onto a substrate and the result was primarily dried by applying hot air thereto at a temperature of 140° C. for 0.5 minutes. Then, the result was secondarily dried by applying hot air thereto at a temperature of 80° C. for 2.5 minutes to obtain a functional layer.

The binding force (a) of the first interfacial layer and the binding force (b) of the second interfacial layer measured using a surface and interfacial cutting analysis system (SAICAS) were about 60 N/m, and about 40 N/m, respectively. That is, the ratio (b/a) of the binding force of the functional layer according to Example was 0.667.

Comparative Example

A slurry containing amorphous carbon, a metal powder, and a binder was applied onto a substrate and the result was primarily dried by applying hot air thereto at a temperature of 80° C. for 5 minutes to obtain a functional layer.

The binding force (a) of the first interfacial layer and the binding force (b) of the second interfacial layer measured using the surface and interfacial cutting analysis system (SAICAS) were about 125 N/m, and about 67 N/m, respectively. That is, the ratio (b/a) of the binding force of the functional layer according to Comparative Example was 0.536.

Experimental Example

Figure 5:
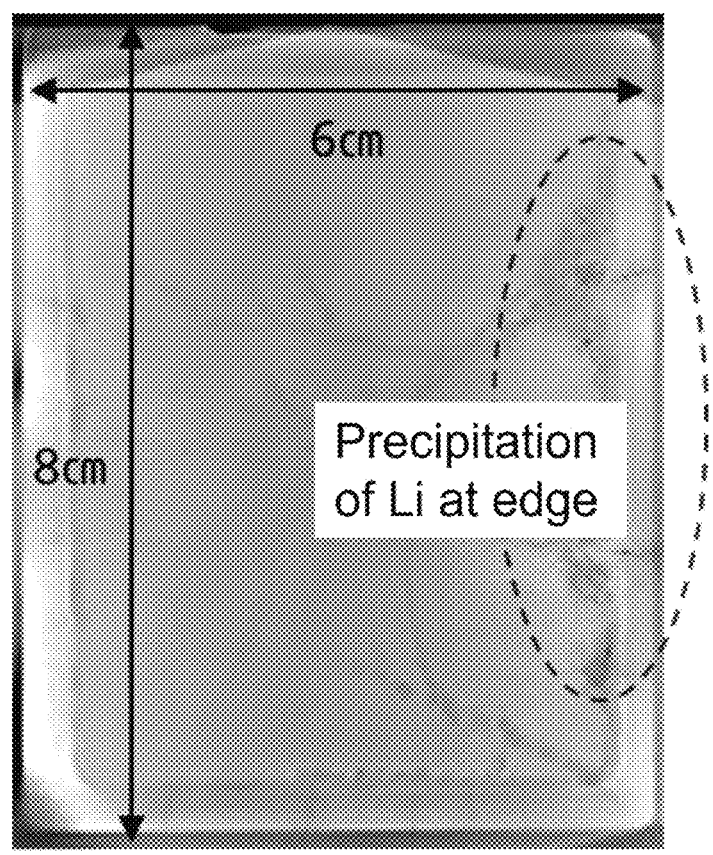
FIG. 5 shows the state in which an all-solid-state battery according to Comparative Example is charged.
Figure 6:
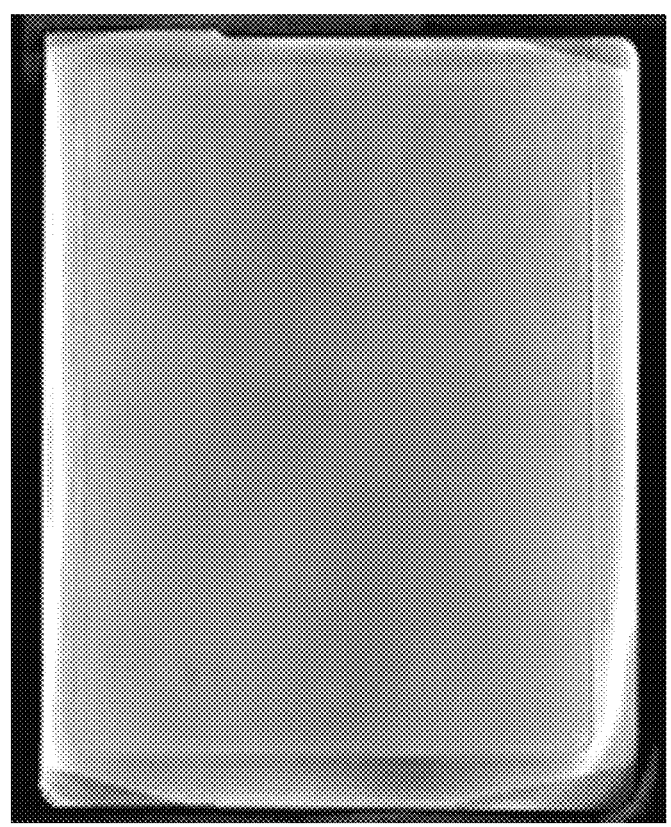
FIG. 6 shows the state in which an exemplary all-solid-state battery according to Example is charged.

A pouch-type all-solid-state battery having a laminated structure as shown in FIG. 1 was manufactured using the functional layers according to Example and Comparative Example. FIG. 5 illustrates the state of charge of an all-solid-state battery according to Comparative Example and FIG. 6 illustrates the state of charge of an all-solid-state battery according to Example. As shown in FIGS. 5 and 6, in Comparative Example, lithium metal (Li) is precipitated near the edge, but in Example, this phenomenon was not found at all.

According to various exemplary embodiments of the present invention, the all-solid-state battery may uniform deposition of lithium and have excellent durability.

The effects of the present invention are not limited to those mentioned above. It should be understood that the effects of the present invention include all effects that can be inferred from the description of the present invention.

The present invention has been described in detail with reference to Experimental Example and Example. However, it will be appreciated by those skilled in the art that changes may be made in Experimental Example and Example without departing from the principles and spirit of the present invention, the scope of which is defined in the appended claims and their equivalents.

What is claimed is:

1. An all-solid-state battery comprising:
an anode current collector;
a functional layer disposed on the anode current collector;
a solid electrolyte layer disposed on the functional layer; and
a cathode layer disposed on the solid electrolyte layer,
wherein the functional layer comprises one or more components that forms an alloy or a compound with lithium, and comprises a first interfacial layer at a side of the solid electrolyte layer and a second interfacial layer at a side of the anode current collector,
wherein a ratio (b/a) of a binding force (b) of the second interfacial layer to a binding force (a) of the first interfacial layer is about 0.6 or greater.

2. The all-solid-state battery according to claim 1, wherein the one or more components in the functional layer comprise:
amorphous carbon; and
a metal powder that forms an alloy with lithium,
wherein the metal powder comprises one or more selected from the group consisting of gold (Au), platinum (Pt), palladium (Pd), silicon (Si), silver (Ag), aluminum (Al), bismuth (Bi), tin (Sn), and zinc (Zn).

3. The all-solid-state battery according to claim 1, wherein the functional layer comprises a binder.

4. The all-solid-state battery according to claim 1, wherein the functional layer has a thickness of about 10 μm to 30 μm.

5. The all-solid-state battery according to claim 1, wherein the binding force of the first interfacial layer and the second interfacial layer is measured by oblique-cutting from the surface of each interfacial layer to a predetermined depth using a surface and interfacial cutting analysis system (SAICAS), and converting the force applied to the surface and interfacial cutting analysis system from the cut point.

6. The all-solid-state battery according to claim 5, wherein the binding force is obtained by oblique-cutting the first interfacial layer and the second interfacial layer to a depth of greater than 0 μm and not greater than about 3 μm from the surface of the interfacial layer using the surface and interfacial cutting analysis system.

7. The all-solid-state battery according to claim 1, wherein, when the all-solid-state battery is charged, lithium metal is deposited between the functional layer and the anode current collector.

8. A vehicle comprising an all-solid-state battery according to claim 1.

9. A method of manufacturing an all-solid-state battery, the method comprising:
preparing a slurry comprising amorphous carbon, a metal powder, and a binder, wherein the metal powder forms an alloy with lithium;
applying the slurry onto a substrate;
primarily drying the substrate applied with the slurry at a first temperature for a first period;
secondarily drying the primarily dried substrate applied with the slurry at a second temperature less than the first temperature for a second period greater than the first period to form a functional layer; and
obtaining a structure in which the anode current collector, the functional layer, the solid electrolyte layer, and the cathode layer are sequentially laminated,
wherein the functional layer comprises a first interfacial layer at a side of the solid electrolyte layer and a second interfacial layer at a side of the anode current collector,
wherein a ratio (b/a) of a binding force (b) of the second interfacial layer to a binding force (a) of the first interfacial layer is about 0.6 or greater.

10. The method according to claim 9, wherein the primary drying is performed at a temperature of about 100° C. to 140° C. for about 0.5 minutes to 5 minutes.

11. The method according to claim 9, wherein the secondary drying is performed at a temperature of about 80° C. to 100° C. for about 10 minutes or less.

12. The method according to claim 9, wherein the functional layer has a thickness of about 10 μm to 30 μm.

13. The method according to claim 9, wherein the binding force of the first interfacial layer and the second interfacial layer is measured by oblique-cutting from the surface of each interfacial layer to a predetermined depth using a surface and interfacial cutting analysis system (SAICAS), and converting the force applied to the surface and interfacial cutting analysis system from the cut point.

14. The method according to claim 13, wherein the binding force is obtained by oblique-cutting the first interfacial layer and the second interfacial layer to a depth of greater than 0 μm and not greater than about 3 μm from the surface of the interfacial layer using the surface and interfacial cutting analysis system.

* * * * *